United States Patent
Sato

(10) Patent No.: US 9,118,859 B2
(45) Date of Patent: Aug. 25, 2015

(54) IMAGE PROCESSING DEVICE AND IMAGE PROCESSING SYSTEM

(75) Inventor: Kimitoshi Sato, Tokyo (JP)

(73) Assignee: Oki Data Corporation, Tokyo (JP)

(*) Notice: Subject to any disclaimer, the term of this patent is extended or adjusted under 35 U.S.C. 154(b) by 466 days.

(21) Appl. No.: 13/311,881

(22) Filed: Dec. 6, 2011

(65) Prior Publication Data

US 2012/0147438 A1   Jun. 14, 2012

(30) Foreign Application Priority Data

Dec. 14, 2010  (JP) ................................. 2010-277700

(51) Int. Cl.
*H04N 1/40* (2006.01)
*H04N 1/387* (2006.01)
*H04N 1/04* (2006.01)

(52) U.S. Cl.
CPC ...................................... *H04N 1/387* (2013.01)

(58) Field of Classification Search
None
See application file for complete search history.

(56) References Cited

U.S. PATENT DOCUMENTS

| 5,515,181 A * | 5/1996 | Iyoda et al. ................... 358/474 |
| 2002/0033862 A1 * | 3/2002 | Yoshihira et al. ............... 347/43 |
| 2011/0085183 A1 * | 4/2011 | Tsuchiya et al. ............... 358/1.2 |

FOREIGN PATENT DOCUMENTS

JP    A-2005-012621    1/2005

* cited by examiner

*Primary Examiner* — Quang N Vo
(74) *Attorney, Agent, or Firm* — Muncy, Geissler, Olds & Lowe, P.C.

(57) ABSTRACT

An image processing device includes an image scanning part that scans an image on a document and generates image data based on the image, an input part that accepts an input designation of a division number into which the image data generated by the image scanning part is divided, and an output resolution of output image data created based on the image data, a division processing part that creates divided image data by dividing the image data by the division number accepted by the input part, controller that calculates a scan resolution based on the division number and the output resolution of the output image data, and a data output part that outputs the divided image data as the output image data. The controller controls the image scanning part to scan the image at the calculated scan resolution.

13 Claims, 18 Drawing Sheets

IMAGE PROCESSING DEVICE AND IMAGE PROCESSING SYSTEM

CROSS REFERENCE TO RELATED APPLICATION

The present application is related to, claims priority from and incorporates by reference Japanese patent application No. 2010-277700, filed on Dec. 14, 2010.

TECHNICAL FIELD

This application relates to an image processing device that includes a plurality of information processing functions, and relates to a system with the device.

BACKGROUND

Recently, in order to conserve resources, image forming devices include a so-called multi-page printing function that prints document images of plural pages on a single recording medium with a reduced layout. For the purpose of obtaining image data that corresponds to each of the original images from a printed material that is outputted using the multi-page printing function, Japanese Laid-Open Patent Application No. 2005-012621 (patent document) discloses an image forming device that outputs image data that corresponds to each of the document images printed in a reduced size by separating the image data into a plurality of recording mediums.

However, the image forming device disclosed in the above patent document divides the reduced document images on the printed material outputted using the multi-page printing function as separate sheets/pages of image data with reduced size, and outputs each image data to a recording device such as a memory and the like. Therefore, the size of the reduced document images is unchanged.

Therefore, there is a problem with the image forming device disclosed in the above patent document that, when the image data generated by scanning a document image of the document for scanning (hereinafter, referred to as "scan document") by an image scanning part, such as a scanner and the like, is faxed to a specified recipient (hereinafter, this function is referred to as a scan-to-fax function), reduced characters on a recording medium received by the recipient are tuned crushed, thereby becoming illegible.

The present application is made in consideration of the above-described problems. One of objects of the present application is to provide an image processing device that provides easily readable image data even when outputting image data is obtained by dividing reduced size document images on printed material that is outputted using a multi-page printing function.

SUMMARY

In order to solve the drawback, an image processing device disclosed in the application includes an image scanning part that scans an image of a document and generates image data based on the image, an input part that accepts an input designation of a division number into which the image data of the document generated by the image scanning part is divided, and an output resolution of output image data created based on the image data, a division processing part that creates divided image data by dividing the image data of the document by the division number accepted by the input part, a controller that calculates a scan resolution based on the division number and the output resolution of the output image data, and a data output part that outputs the divided image data as the output image data. The controller controls the image scanning part to scan the image on the document at the calculated scan resolution.

In another view, an image processing system disclosed in the application includes an image processing device and an image forming device. The image processing device includes an image scanning part that scans an image on a document and generates image data based on the image, an input part that accepts an input designation of a division number into which the image data of the document generated by the image scanning part is divided, and an output resolution of output image data created based on the image data, a division processing part that creates divided image data by dividing the image data of the document by the division number accepted via the input part, a controller that calculates a scan resolution based on the division number and the output resolution of the output image data, and a data output part that outputs the divided image data and one of output resolution information and print output size information to the image forming device. The controller controls the image scanning part to scan the image on the document at the calculated scan resolution, and the image forming device includes, a data receiving part that receives the divided image data and one of the output resolution information and the print output size information from the image processing device; and an image forming part that determines a print output size of the divided image data received by the data receiving part, based on the one of the output resolution information and the print output size information received by the data receiving part, and prints the divided image data with the determined print output size.

According to the present application, an image processing device is provided that provides easily readable image data even when outputting image data is obtained by dividing reduced size document images on printed material that is outputted using the multi-page printing function.

DETAILED DESCRIPTION OF EMBODIMENTS

Embodiments of the present application are explained below with reference to the drawings. The embodiments are not limited to the below descriptions but may be appropriately modified without departing from the scope of the embodiments.

First Embodiment

In the explanation of a first embodiment, a multi-function peripheral (MFP) 600 is described as an example of an image processing device according to the present application. The MFP 600 is a multi-function peripheral device that is capable of generating image data based on a document image scanned by an image scanning part, transmitting the image data by fax (scan-to-fax) or E-mail (scan-to-E-mail), storing the image data in a movable storage medium such as a universal serial bus (USB) memory (scan-to-USB memory) or the like, and storing the image data in a storage medium on a network (scan-to-network). In the explanation of the embodiments, an image formed on a document to be scanned by the MFP 600 is referred to as a document image.

Figure 1:
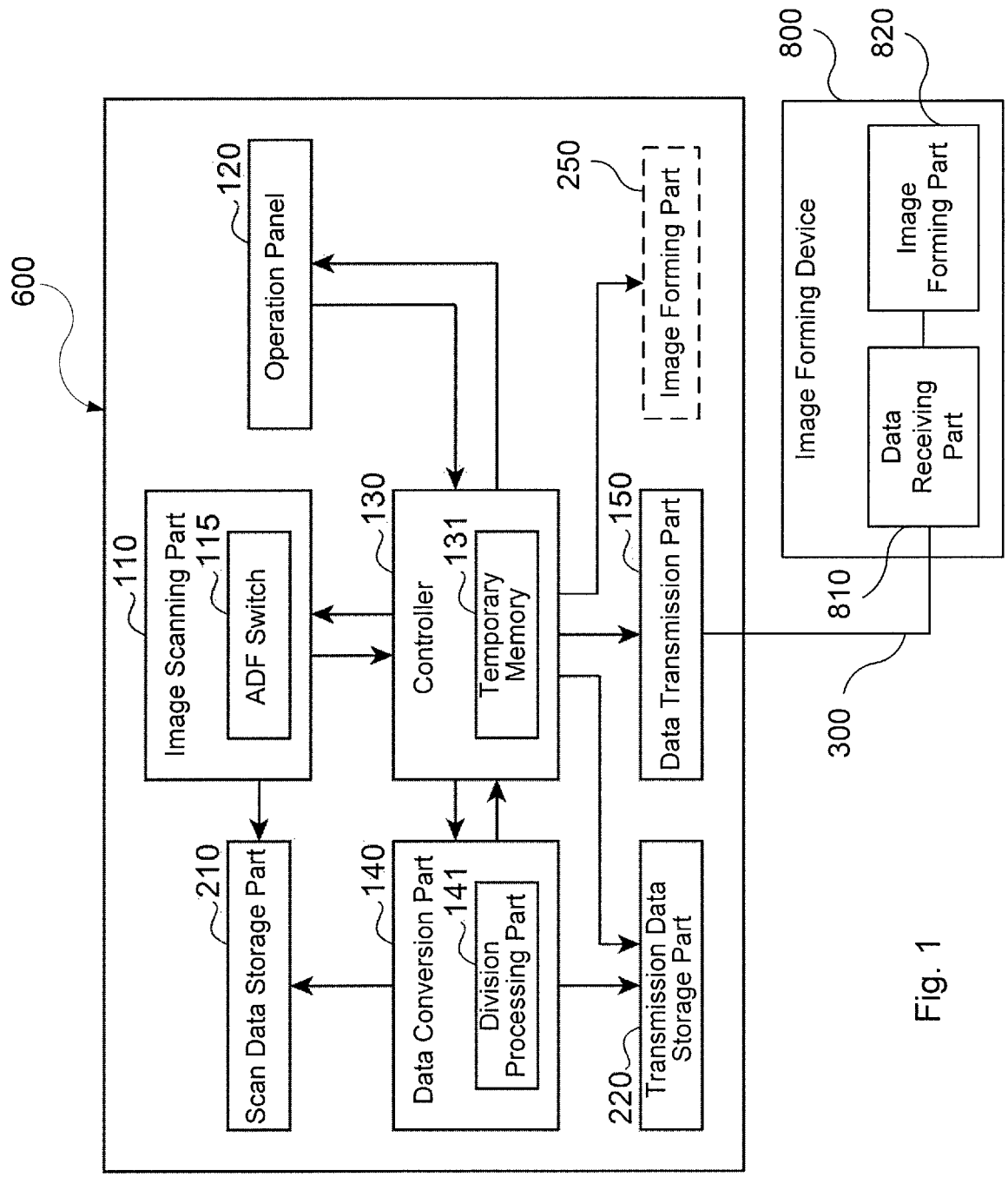
FIG. 1 is a functional block diagram for explaining a functional configuration of a multi-function peripheral (MFP) according to a first embodiment.

FIG. 1 is a functional block diagram for explaining a functional configuration of the MFP 600 according to the first embodiment.

The MFP 600 includes an image scanning part 110, an operation panel 120 as an input part, a controller 130, a data conversion part 140, a data output part (e.g., data transmission part 150), a scan data storage part 210 and a transmission data storage part 220. In this embodiment, the MFP 600 is connected to an external image forming device 800 via a FAX network 300.

The image scanning part 110 includes a scanning sensor (not shown) including a light source that irradiates light to a document, a lens that collects the light reflected from the document, and a photoelectric conversion element such as a charge coupled device (CCD) that generates a voltage corresponding to a document image; an auto document feeder (ADF) (not shown) that automatically feeds a document to a document image scanning position of the scanning sensor; and an ADF switch 115 that detects the presence of the document on the ADF and outputs an ON/OFF signal based on a detection result. In FIG. 1, the image scanning part 110 is included in the MFP 600. However, the image scanning part 110 may be externally provided connected to the MFP 600 by a USB cable or the like.

The image scanning part 110 notifies the controller 130 of the ON/OFF signal outputted from the ADF switch 115 and scans with the scanning sensor document images on each scan document that is loaded in the ADF, based on a scan instruction from the controller 130. Then, the image scanning part 110 stores the generated image data in the scan data storage part 210. In addition, the image scanning part 110 notifies the controller 130 when the scanning of all document images has been completed.

The operation panel 120 includes an information display, such as a liquid crystal display (LCD) or the like, and manages communication of necessary information between the user and the MFP 600. More specifically, the operation panel 120 displays on the information display information directed to the user from the controller 130. The operation panel 120 also outputs, to the controller 130, information inputted by the user via an information input part such as a touch panel provided integrally with the information display or buttons provided near the information display.

The controller 130 includes a central processing unit (CPU) that performs various calculations, a random access memory (RAM), which is a volatile memory, used as a temporary memory 131 by the CPU, and a read-only memory (ROM), which is a non-volatile memory, that stores various control programs, for example. The controller 130 generally controls the MFP 600 by causing the CPU to execute the various control programs stored in the ROM. The various controls programs may be provided externally by a storage medium, such as a compact disk (CD), or from a network and may be saved in a memory inside the MFP 600.

The temporary memory 131 temporarily stores information designated by the user via the operation panel 120, that is, in the present embodiment, the later-discussed fax output resolution information (e.g., transmission resolution information; hereinafter, that is may be simply referred to as transmission resolution information), scan document assignment information, fax destination information, and the like.

The ON/OFF signal of the ADF switch 115 or the completion of the image scanning from the image scanning part 110 is provided to the controller 130. In addition, the controller 130 instructs the image scanning part 110 to scan the document image at a designated resolution.

Moreover, the controller 130 outputs, to the operation panel 120, a fax output resolution (e.g., transmission resolution) described in the menu items shown in later-discussed FIGS. 6, 7, 8, 10 and the like and an instruction to display a fax destination setting screen. Further, the controller 130 obtains transmission resolution information, scan document assignment information and fax destination information inputted by the user via the operation panel 120, and a scan start instruction by depression of a scan start button. Furthermore, the controller 130 outputs the scan document assignment information, data conversion start instruction and transmission resolution information to the data conversion part 140 and receives a notification for completion of data conversion from the data conversion part 140. In addition, the controller 130 outputs a fax transmission number, which is fax destination information, to the data transmission part 150, reads out the transmission image data from the transmission data storage part 220, and forwards the read transmission image data to the data transmission part 150.

The data conversion part 140 includes a division processing part 141. The data conversion part 140 obtains from the controller 130 the scan document assignment information, the data conversion start instruction and the transmission resolution information. In addition, the data conversion part 140 reads out the image data from the scan data storage part 210 and passes the image data to the division processing part 141. Then, the data conversion part 140 stores in the transmission image data storage part 220 the image data after the conversion processing by the division processing part 141 as the output image data (e.g., transmission image data) and notifies the controller 130 of the storage.

The division processing part 141 divides the image data received from the data conversion part 140 based on the obtained scan document assignment information. Then, the division processing part 141 generates transmission image data by adding the obtained transmission resolution information to the divided image data, and returns the transmission image data to the data conversion part 140. More specifically, in the case where the scan document is in a 4 UP format, the division processing part 141 divides the image data by two horizontally and two vertically. The division processing part 141 prestores a method for dividing the image data in various cases.

The data transmission part 150 obtains the fax destination information and the transmission image data and transmits the transmission image data to the later-described image forming device 800 at the fax destination.

The scan data storage part 210 includes a storage medium, such as a hard disk drive (HDD), flash memory and the like, and stores the image data based on the document image generated by the image scanning part 110.

The transmission data storage part 220 includes a storage medium, such as a hard disk drive (HDD), flash memory and the like, and stores the transmission image data converted and outputted by the data conversion part 140.

The image forming device 800 includes a data receiving part 810 and an image forming part 820. The data receiving part 810 receives the transmission image data transmitted from the data transmission part 150 of the MFP 600 via the network 300 and passes the image data to the image forming part 820 after converting the transmission image data in an appropriate format. The image forming part 820 performs the printing of the image data on a sheet by using a known technique, such as thermal a transfer method, a laser printing method and an inkjet printing method.

Figure 2:
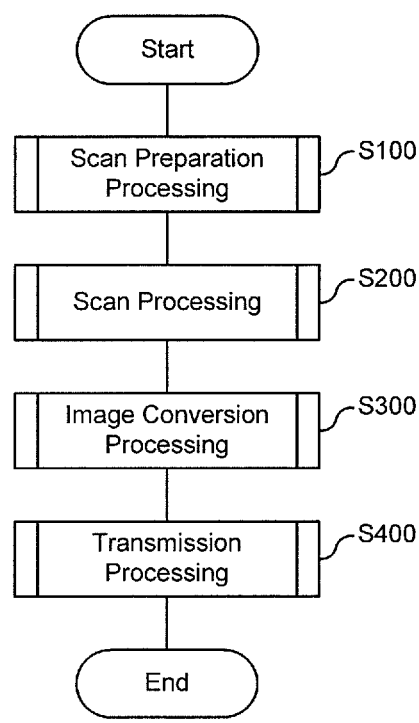
FIG. 2 is a flow diagram explaining a main flow of processing according to the first embodiment.

Next, the flow of processing by the MFP 600 with the above-described configuration is explained by using FIG. 2. The operation shown in FIG. 2 is a main flow of the processing according to the present embodiment. The main flow is first explained, and then each step shown in FIG. 2 is explained in detail.

First, at S100, the controller 130 executes a scan preparation processing and obtains a function intended by the user that is inputted via the operation panel 120. In the present embodiment, the scan-to-fax is explained as an example of a function inputted by the user. At this time, the user sets the fax transmission resolution information, the scan document assignment information and the fax destination information.

Next, the controller 130 controls the image scanning part 110 to execute the scanning of the document image on the scan document (S200).

When the image scanning part 110 generates image data, the data conversion part 140 executes the image conversion processing (S300). Here, the division processing part 141 of the data conversion part 140 divides the obtained image data based on the scan document assignment information. The divided image data is formed in the transmission resolution designated by the user. More specifically, the amount of the divided image data becomes substantially the same as the amount of the undivided image data scanned at the transmission resolution designated by the user.

Finally, the data transmission part 150 transmits the transmission image data to the fax destination (S400) and ends the processing.

Figure 3:
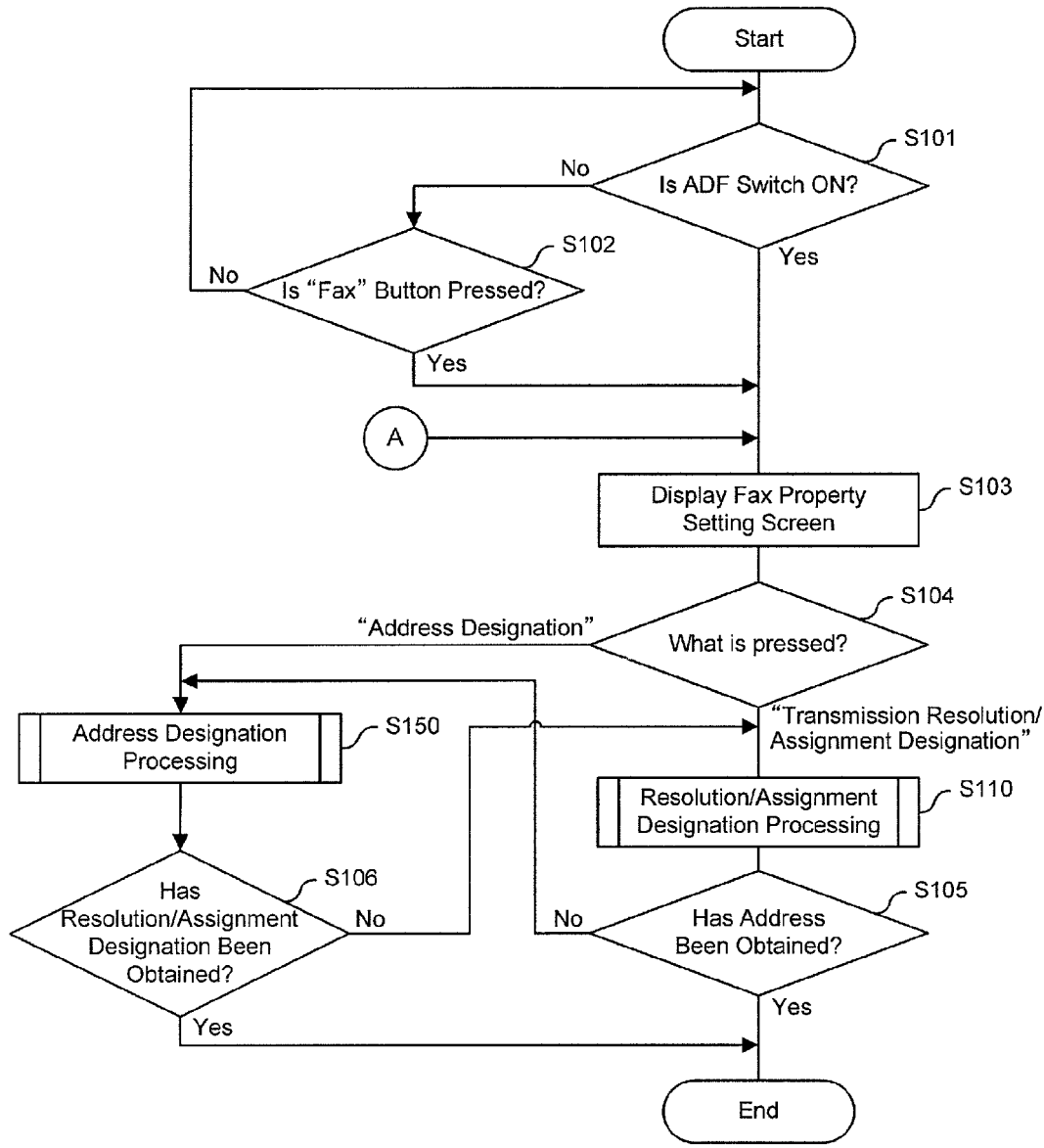
FIG. 3 is a flow diagram explaining scan preparation processing at S100 in FIG. 2.

Next, each step in the main flow in FIG. 2 is explained. FIG. 3 is a flow diagram explaining a scan preparation processing at S100 in FIG. 2. The scan preparation processing is executed by the controller 130 via the operation panel 120.

Figure 4:
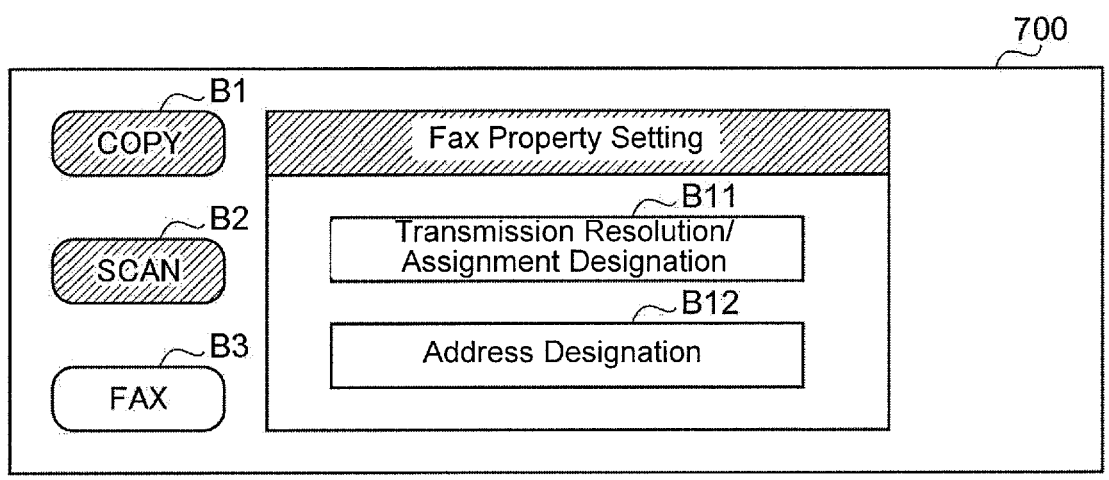
FIG. 4 explains an example of a fax property setting screen.

First, when an ON signal from the ADF switch 115 is notified by the image scanning part 110 (Yes, S101) or when a depression signal that indicates that a "FAX" button has been pressed is inputted via the operation panel 120, that is, when the "FAX" button is pressed (Yes, S102), the controller 130 outputs an instruction to the operation panel 120 to display a fax property setting screen 700 shown in FIG. 4.

When the operation panel 120 displays the fax property setting screen 700 (S103) and when a "Transmission Resolution/Assignment Designation" button B11 is pressed by the user ("Transmission Resolution/Assignment Designation", S104), the controller 130 executes the resolution/assignment designation processing (S110).

After the completion of the resolution/assignment designation processing at S110, the controller 130 checks the temporary memory 131. When a fax destination has not been designated, that is, when an address has not been obtained (No, S105), the controller 130 executes address designation processing (S150). After the address designation processing at S150, the controller 130 checks the temporary memory 131 again. When the designation of the transmission resolution/assignment information has not been properly obtained, that is, when the resolution/assignment designation has not been obtained (No, S106), the controller 130 reexecutes the resolution/assignment designation processing at S110.

On the other hand, when the "Address Designation" button B12 is pressed by the user ("Address Designation," S104), the controller 130 executes the address designation processing (S150).

After the completion of the address designation processing at S150, the controller 130 checks the temporary memory 131. When the fax transmission resolution/assignment designation processing has not been executed, that is, when the resolution/assignment designation has not been obtained (No, S106), the controller 130 executes the resolution/assignment designation processing (S110). After the completion of the resolution/assignment designation processing at S110, the controller 130 checks the temporary memory 131 again. When a fax destination has not been properly obtained, that is, when an address has not been obtained (No, S105), the controller 130 reexecutes the address designation processing at S150.

Figure 5:
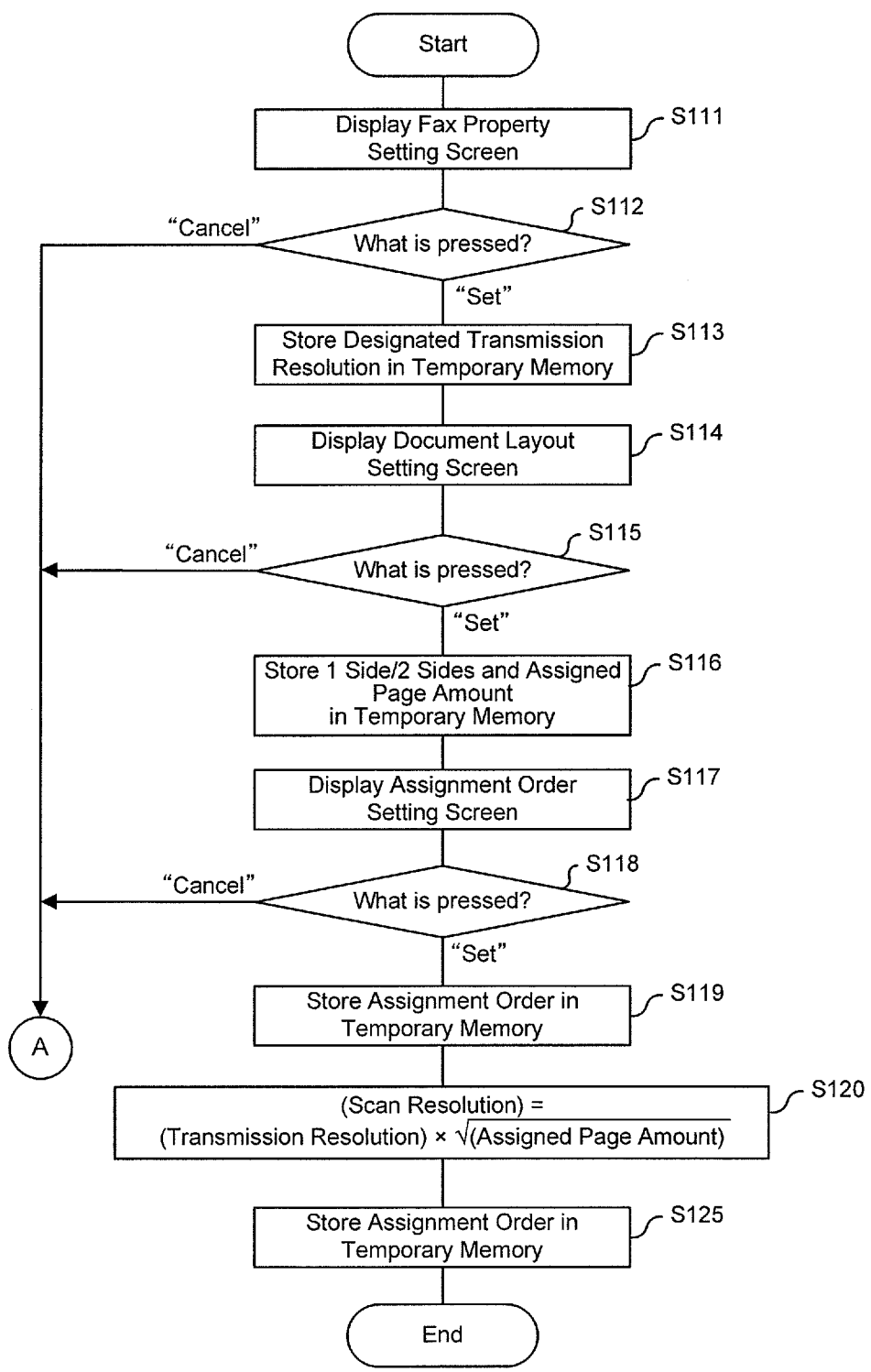
FIG. 5 is a flow diagram explaining resolution/assignment designation processing at S110 in FIG. 3.

FIG. 5 is a flow diagram explaining the resolution/assignment designation processing at S110 in FIG. 3. The resolution/assignment designation processing is executed by the controller 130 via the operation panel 120.

Figure 6:
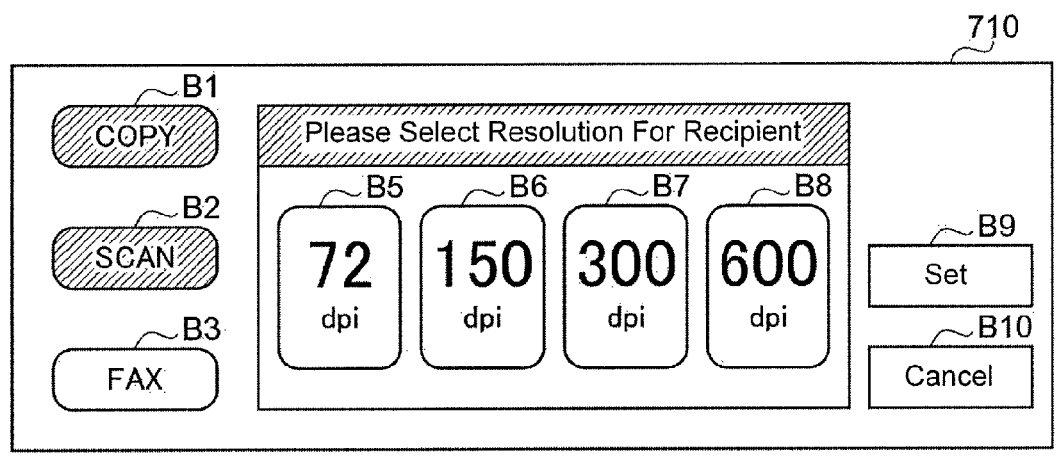
FIG. 6 explains an example of a resolution setting screen.
Figure 7:
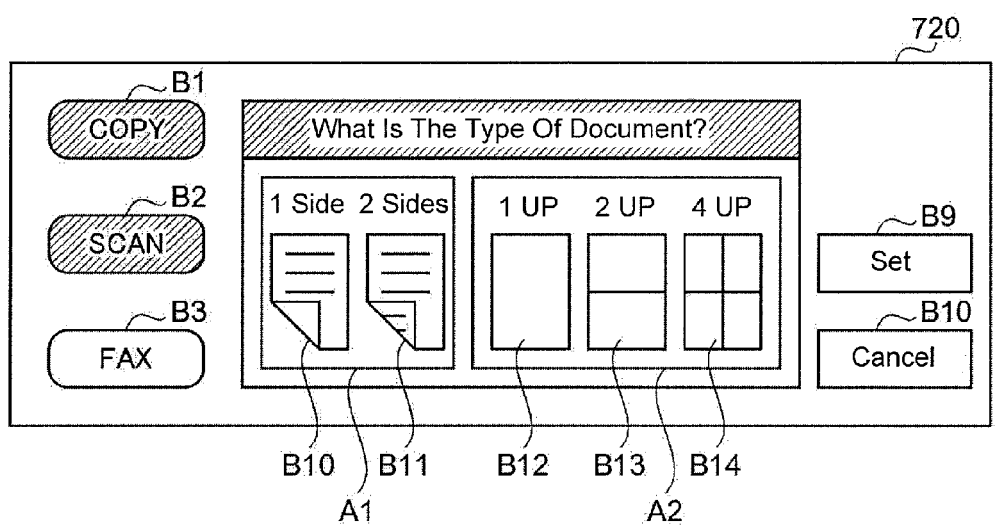
FIG. 7 explains an example of a document layout setting screen.

When the resolution/assignment designation processing is selected by the user, that is, when the "Transmission Resolution/Assignment Designation" button is pressed at S104 in FIG. 3 ("Transmission Resolution/Assignment Designation", S104), the controller 130 outputs an instruction to the operation panel 120 to display a resolution setting screen 710 shown in FIG. 6.

After receiving the display instruction from the controller 130, the operation panel 120 displays the resolution setting screen 710 (S111).

As shown in an example in FIG. 6, the resolution setting screen 710 includes resolution designation buttons ("72 dpi" button B5, "150 dpi" button B6, "300 dpi" button B7 and "600 dpi" button B8; "dpi"=dot per inch) that accept a selection of a transmission resolution, which is a resolution of the image data that the user sends to the fax destination, and a "Set" button B9 that accepts an input of a confirmation of the designation of resolution. For example, when the user desires to send the image data to the fax destination at the resolution of 300 dpi, the user confirms the designation of the transmission resolution by pressing the "Set" button B9 after pressing the "300 dpi" button B7 that indicates the resolution of 300 dpi.

In the resolution setting screen 710 displayed on the operation panel 120, when a depression signal of the "Set" button B9 is inputted, that is, when the "Set" button is pressed ("Set", S112), the controller 130 stores in the temporary memory 131 the transmission resolution of 72 dpi, 150 dpi, 300 dpi or 600 dpi as designated by the user S113). Then, the controller 130 provides an instruction to display a document layout setting screen 720 shown in FIG. 7.

When the display instruction is received from the controller 130, the operation panel 120 displays the document layout setting screen 720 (S114).

The document layout setting screen 720 includes regions A1 and A2 that are to be selected by the user in accordance of a layout of the scan document. In the region A1, a "1 side" button B10 and a "2 sides" button B11 are formed. In the region A2, a "1 UP" button B12, a "2 UP" button B13 and a "4 UP" button B14 are formed. For example, when the user sends the scan document in a 2-side and 4 UP format by scan-to-fax, the user selects the layout of the scan document by pressing the "2 sides" button B11 from the region A1 and the "4 UP" button B14 in the region A2 and finally by pressing the "Set" button B9.

In the document layout setting screen 720 displayed on the operation panel 120, when a depression signal for the "Set" button B9 is inputted, that is, when the "Set" button is pressed ("Set", S115), the controller 130 stores in the temporary memory 131 the designation of 1 side or 2 sides and the assigned page amount of the scan document (S116). Then, the controller 130 provides an instruction to display an assignment order setting screen 730 shown in FIG. 8.

When a display instruction is received from the controller 130, the operation panel 120 displays the assignment order setting screen 730 (S117).

Figure 8:
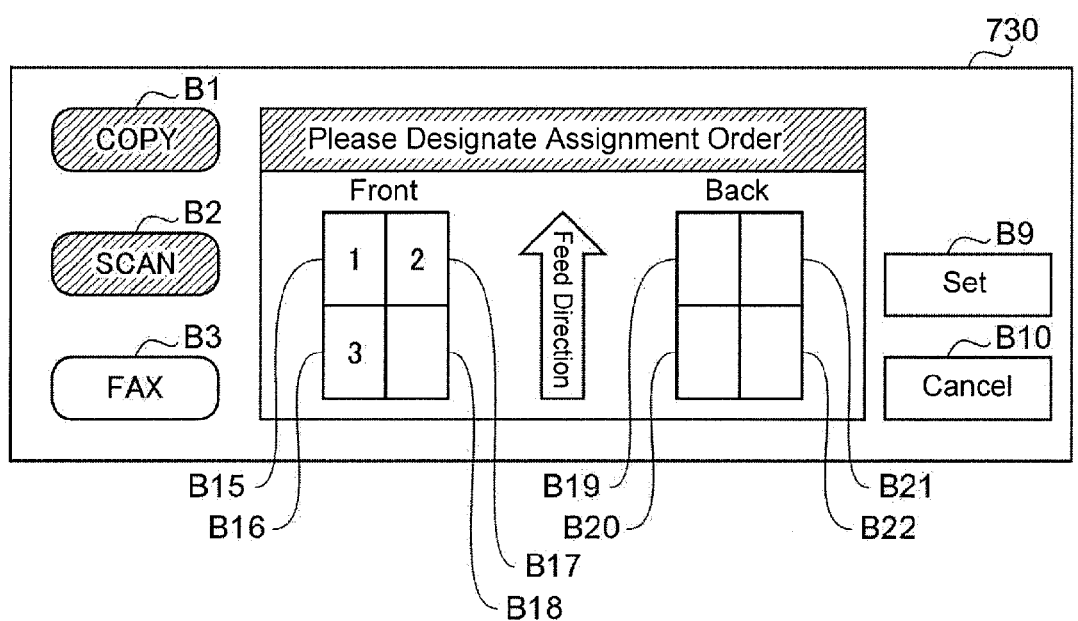
FIG. 8 explains an example of an assignment order setting screen.

The assignment order setting screen 730 is a setting screen that is displayed based on the designation of 1 side or 2 sides and the assigned page amount for the scan document inputted by the user via the document layout setting screen 720. The assignment order setting screen 730 includes a button B15, a button B16, a button B17, a button B18, a button B19, a button B20, a button B21 and a button B22 that indicate assigned regions of the document. The user determines an output order (layout information) of the image data that corresponds to the assignment regions by pressing the buttons B15 to B22 that indicate the assigned regions of the document as displayed on the operation panel 120, in accordance of the order of the regions that the user desires. FIG. 8 illustrates an example of the assignment order setting screen that is displayed when the user designates 2 sides and 4 as the assigned page amount (i.e., 4 UP) in the document layout setting screen 720 shown in FIG. 7 discussed above. In this example, the front side of the scan document includes regions that are respectively assigned with the button B15, the button B17, the button B16 and the button B18 in this order. In this example, the user has designated the output of image data of the scan document that corresponds to the assignment regions sequentially based on the order designated by the button B15, the button B17 and the button B16. The user may also select the assignment order for the back side by pressing regions indicated by the buttons B19 to B22 and finally by pressing the "Set" button B9.

In the assignment order setting screen 730 displayed on the operation panel 120, when the depression signal for the "Set" button B9 is inputted, that is, when the "Set" button is pressed ("Set", S118), the controller 130 stores in the temporary memory 131 the assignment order for the scan document (S119).

At S120, the controller 130 calculates a scan resolution by the image scanning part 110. More specifically, the controller 130 calculates the scan resolution by using the following equation:

$$(\text{Scan Resolution}) = (\text{Transmission Resolution}) \times \sqrt{\text{AssignedPageAmount}}$$

For example, when a 4 UP document is sent by fax at 300 dpi, the controller 130 calculates the scan resolution as follows:

$$(\text{Scan Resolution}) = 300 \text{ (dpi)} \times \sqrt{4} = 600 \text{ dpi}$$

The calculated scan resolution is stored in the temporary memory 131 by the controller 130 (S125).

At S112, S115 and S118, when a "Cancel" button B10 is pressed by the user, the processing by the controller 130 returns to S103 in FIG. 3. Then, the controller 130 outputs an instruction to the operation panel 120 to display the fax property setting screen 700. The operation panel 120 that has received the display instruction from the controller 130 displays the fax property setting screen 700.

Figure 9:
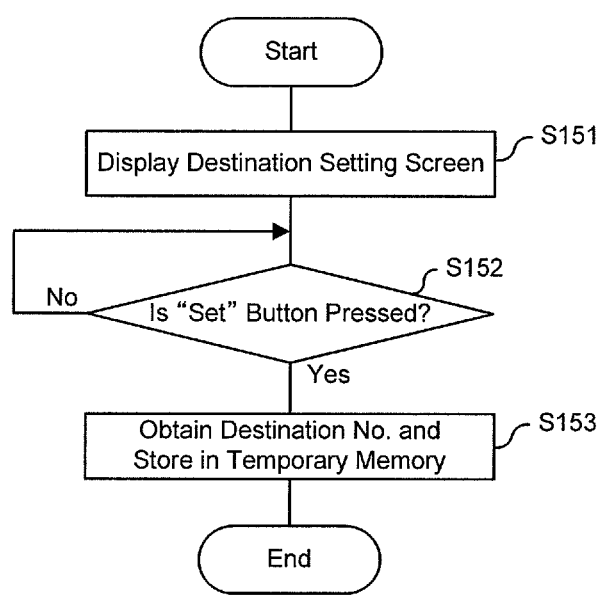
FIG. 9 is a flow diagram explaining address designation processing at S150 in FIG. 3.

Next, the address designation processing at S150 is explained by using the flow diagram in FIG. 9. The address designation processing is executed by the controller 130 via the operation panel 120.

Figure 10:
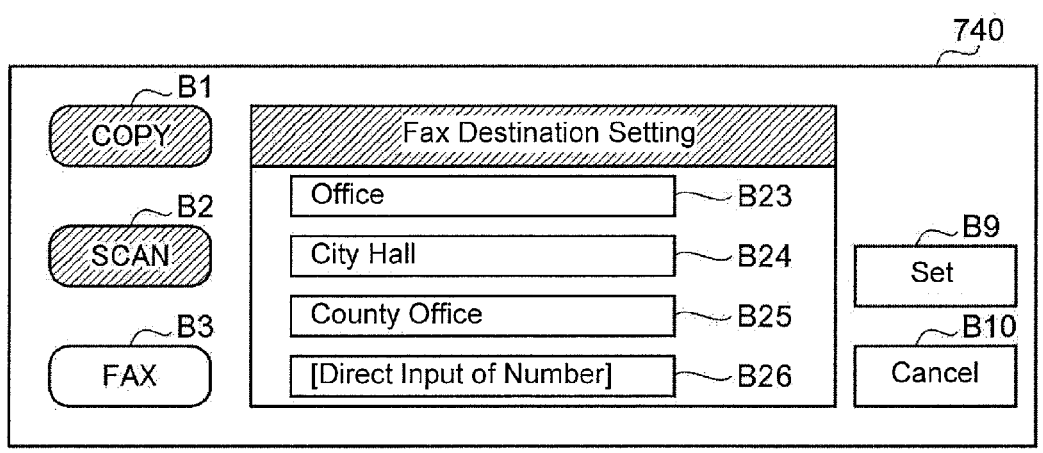
FIG. 10 explains an example of a destination setting screen.

When the address designation processing is selected by the user, that is, when the "Address Designation" button is pressed at S140 in FIG. 3 ("Address Designation", S104), the controller 130 outputs an instruction to the operation panel 120 to display the designation setting screen 740 shown in FIG. 10.

When the display instruction from the controller 130 is received, the operation panel 120 displays the designation setting screen 740 (S151).

As shown in the example in FIG. 10, the destination setting screen 740 includes destination designation buttons B23, B24 and B25 by which a selection of a destination already registered in an address book, and a "Direct input of number" button B26 by which a direction input of a fax number of the destination is accepted. The user confirms the destination by either selecting a destination already registered in the address book and pressing the destination designation buttons B23, B24 or B25, or by pressing the "Direct input of number" button B26 and directly inputting a fax number of the destination using a number input buttons (not shown), and by pressing the "Set" button B9.

In the destination setting screen 740 displayed on the operation panel 120, when a depression signal for the "Set" button B9 is inputted, that is, when the "Set" button is pressed (Yes, S152), the controller 130 stores in the temporary memory 131 the number of the destination selected and set by the user (S153).

Figure 11:
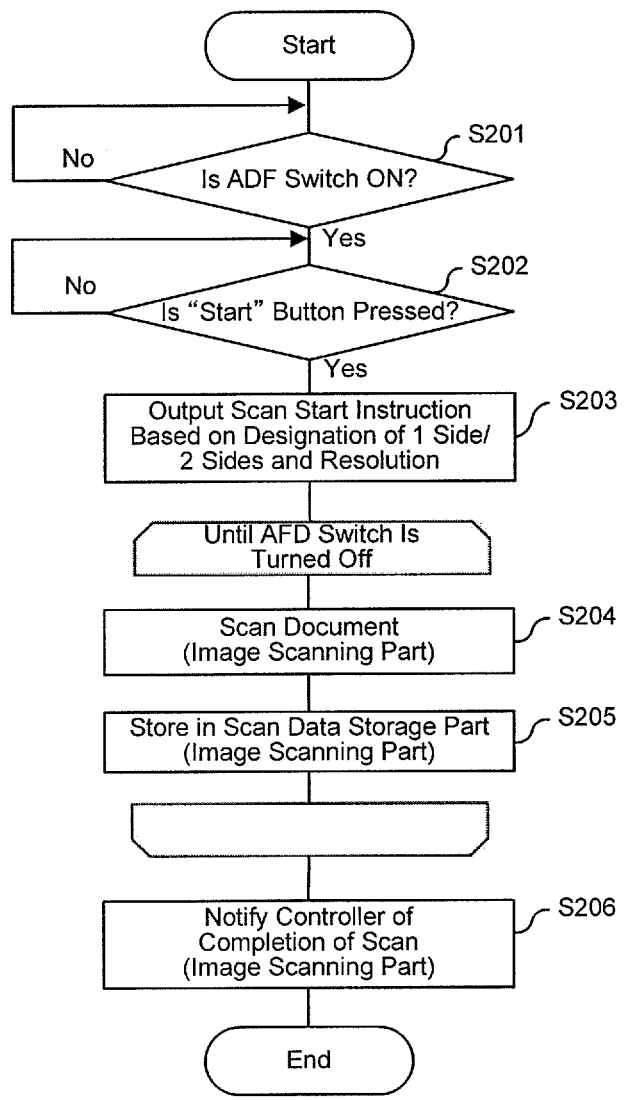
FIG. 11 is a flow diagram explaining scan processing by an image scanning part 110 at S200 in FIG. 2.

Next, the scanning processing by the image scanning part 110 at S200 in FIG. 2 is explained by using the flow diagram in FIG. 11. The scanning processing is executed by the controller 130 by controlling the image scanning part 110.

First, when the ON signal from the ADF switch 115 is notified by the image scanning part 110, that is, when the ADF switch is ON (Yes, S201), and when a depression signal that indicates that a "Start" button (not shown) is pressed is inputted via the operation panel 120, that is, when the "Start" button is pressed (Yes, S202), the controller 130 outputs a scan start instruction to the image scanning part 110 based on the designation of 1 side or 2 sides stored in the temporary memory 131 at S116 in FIG. 5 and the scan resolution stored in the temporary memory 131 at S125 in FIG. 5 (S203).

The image scanning part 110 scans each page of the document (S204) and stores in the scan data storage part 210 of the image data based on the generated document image (S205), until an OFF signal is outputted from the ADF switch 115, that is, until the ADF switch is turned OFF.

When the entire document is scanned and when the OFF signal is outputted from the ADF switch 115, the image scanning part 110 notifies the controller 130 of the completion of the scanning (S206), and the scan processing is ended.

Figure 12:
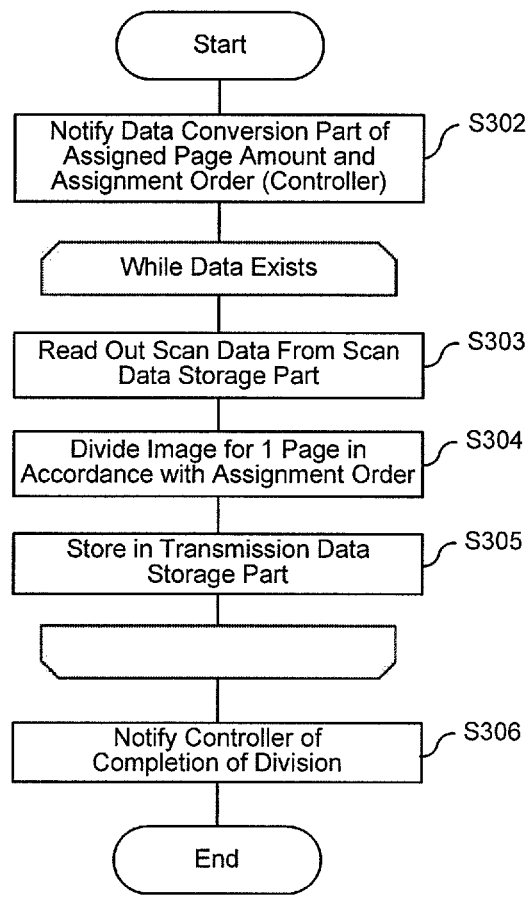
FIG. 12 is a flow diagram explaining image conversion processing by a data conversion part 140 at S300 in FIG. 2.

Next, the image conversion processing by the data conversion part 140 at S300 in FIG. 2 is explained by using the flow diagram in FIG. 12. The image conversion processing is executed by the controller 130 by controlling the data conversion part 140.

The data conversion part 140 executes the image conversion processing when the assigned page amount stored at S116 in FIG. 5 and a notification of the assignment order stored at S119 in FIG. 5 are received from the controller 130 (S302).

The data conversion part 140 reads out the image data for one page of the scan document and passes the image data to the division processing part 141 (S303) while the image data exists in the scan data storage part 210.

The division processing part 141 divides the image data in accordance with the assignment order from the controller 130 (S304).

Then, the division processing part 141 adds transmission resolution information to the image data divided at S304 and sequentially stores in the transmission data storage part 220 as the transmission image data (S305).

When the entire image data stored in the scan data storage part 210 is read out and when the division processing is completed, the data conversion part 140 notifies the controller 130 of the completion of division (S306).

Figure 13:
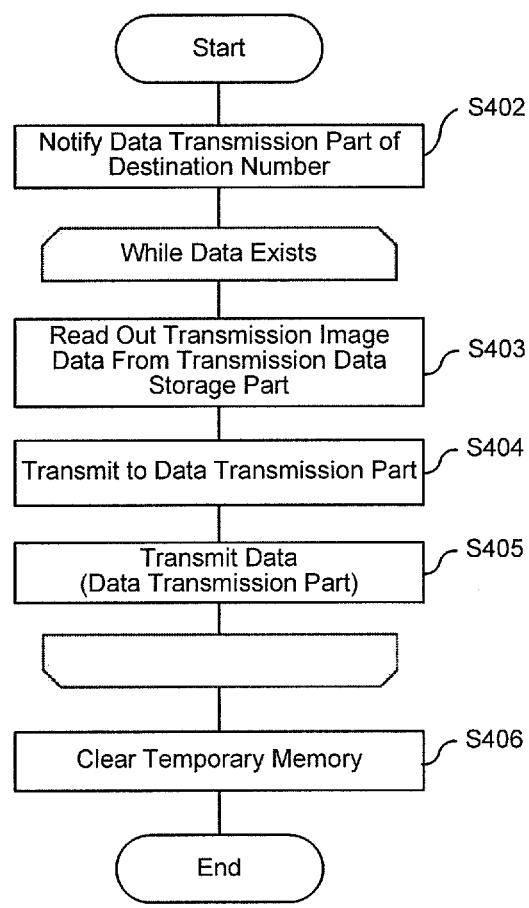
FIG. 13 is a flow diagram explaining transmission processing by a data transmission part 150 at S400 in FIG. 2.

Lastly, the transmission processing by the data transmission part 150 at S400 in FIG. 2 is explained by using the flow diagram in FIG. 13. The transmission processing is executed by the controller 130 by controlling the data transmission part 150.

First, the controller 130 notifies the data transmission part 150 of a destination number stored in the temporary memory 131 in FIG. 153 in FIG. 9 (S402).

While the transmission image data stored by the division processing part 140 exists in the transmission data storage part 220 based on the output order (assignment order) determined by the user as described above, the controller 130 reads out the transmission image data (S403) in the assignment order and forwards to the data transmission part 150 (S404).

When the reading and forwarding of the transmission image data stored in the transmission data storage part 220 are completed, and when the entire transmission processing by the data transmission part 150 is completed (S405), the controller clears up the temporary memory 131 (S406) and ends the series of the processing.

As described above, according to the first embodiment, image data based on a document image formed by multi-page printing is transmitted by dividing the image data into respective pages of image data at a resolution set by the user, who is the sender, and by converting the image data to be easily readable by the recipient. More specifically, when the user designates the transmission resolution at 300 dpi and when a 4 UP document is scanned at 600 dpi, the data size of the image data after being divided into four regions (image data for one page) and the data size of a 1 UP document scanned at 300 dpi become equivalent. In addition, transmission resolution information is added to the transmission image data. As a result, the image forming device that performs printing on a sheet based on the image data becomes capable of printing the image data based on the transmission resolution information and the transmission image data, on the same size of document as the scan document and at the transmission resolution designated by the user, when the transmission image data is received. More specifically, a case is considered where a transmission resolution of 300 dpi is designated when the user scans an A4-size, 4 UP document. The image forming device forms an image for a single page of A4-size paper at the resolution of 300 dpi designated by the user, based on the transmission resolution information of 300 dpi.

In the present embodiment, the explanation was made with the FAX network 300 as an example. However, the connection is not limited to the FAX network but may include other network systems, such as Internet, wired or wireless local area network (LAN) and a connection via a cable, such as a universal serial bus (USB) cable.

In addition, The MFP 600 may also include an image forming part 250 (FIG. 1) therein. The image forming part 250 may be similar in structure and functions to the image forming part 820 in the image forming device 800. In this case, the image data may be sent directly to the image forming part 250 without first sending the image data to the data transmission part 150.

Moreover, in that case, the divided image data may be printed in a large size at the above-described scan resolution by the image forming part 250.

Further, the present embodiment is explained with the output resolution information (transmission resolution information) as an example. However, this is not limited to the output resolution information, but information related to a size of sheet used for printing (print output size information) may be used. By using the print output size information, the user may designate an output sheet size to the image forming device at the destination. For example, when the user desires an output of the image data on an A4 or B5-size sheet, the user may designate the sheet size by using the operation panel 120, and the print output size information may be added to the divided image data.

Second Embodiment

In a second embodiment, a configuration is explained which includes a resolution adjustment part that adjust the resolution of the divided image data that is explained in the first embodiment. In the explanation of the present embodiment, an explanation of parts that are the same as in the first embodiment is omitted.

Figure 14:
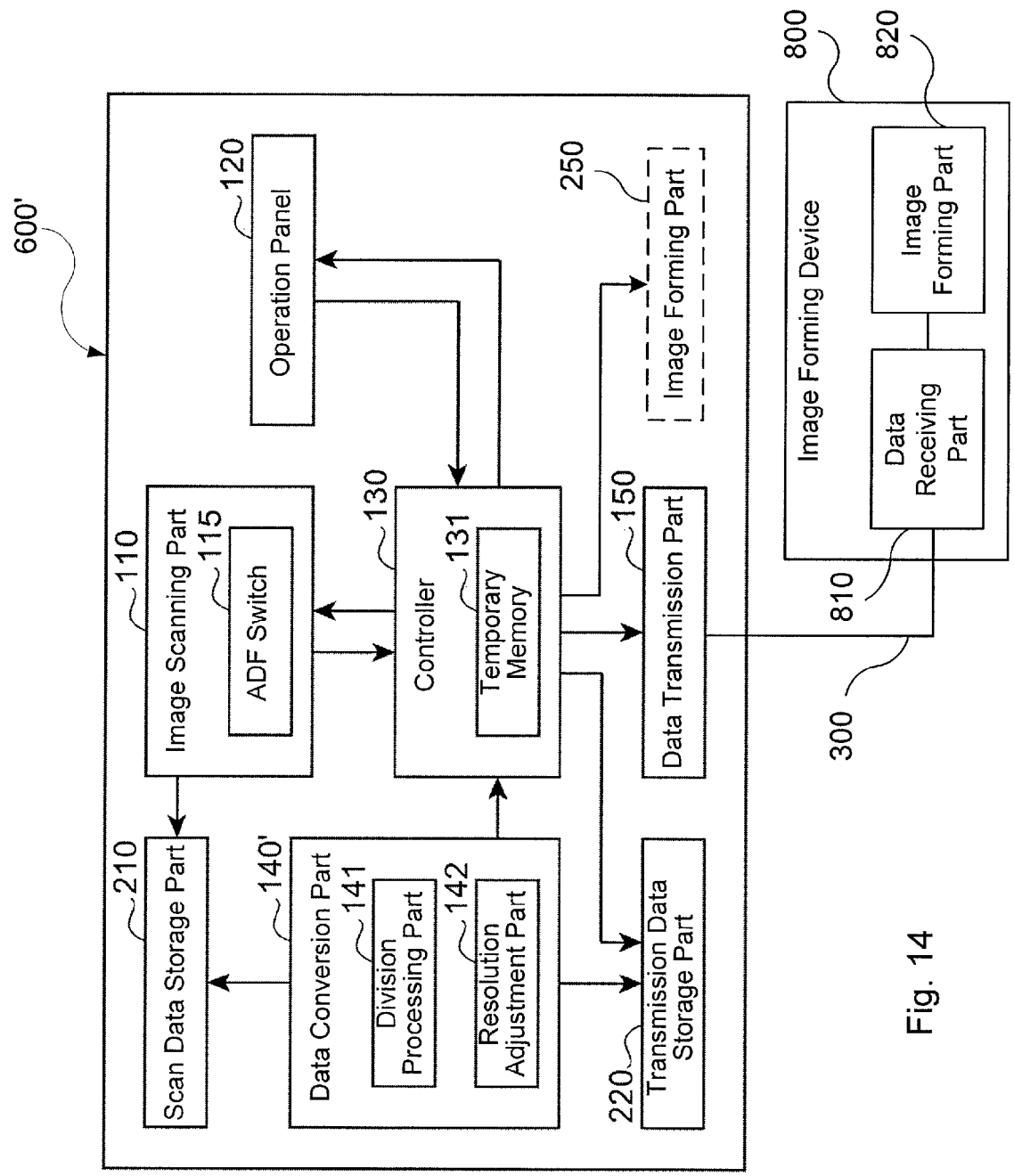
FIG. 14 is a functional block diagram for explaining a functional configuration of the MFP according to a second embodiment.

FIG. 14 is a functional block diagram for explaining a functional configuration of the MFP 600' according to the second embodiment.

The MFP 600' includes an image scanning part 110, an operation panel 120 as an input part, a controller 130, a data conversion part 140', a data transmission part 150, a scan data storage part 210 and a transmission data storage part 220.

The controller 130 includes a CPU that performs various calculations, a ROM, which is a volatile memory, used as a temporary memory 131 by the CPU, and a RAM, which is a non-volatile memory, that stores various control programs, for example. The controller 130 generally controls the MFP 600' by causing the CPU to execute the various control programs stored in the ROM.

The temporary memory 131 temporarily stores information designated by the user via the operation panel 120, that is, in the present embodiment, the fax transmission resolution information (hereinafter, may be simply referred to as transmission resolution information), scan document assignment information, fax destination information, and the like.

The ON/OFF signal of the ADF switch 115 or the completion of scanning the image from the image scanning part 110 is notified to the controller 130. In addition, the controller 130 instructs the image scanning part 110 to scan the document image at a designated resolution.

Moreover, the controller 130 outputs, to the operation panel 120, a fax transmission resolution described in the menu items shown in FIGS. 6, 7, 8, 10 and the like and an instruction to display a fax destination setting screen. Further, the controller 130 obtains fax transmission resolution information, scan document assignment information and fax destination information inputted by the user via the operation panel 120, and a scan start instruction by depression of a scan start button. Furthermore, the controller 130 outputs the scan document assignment information, the fax transmission resolution information, a scan resolution that the image scanning part 110 uses to scan the document image, and the data conversion start instruction to the data conversion part 140' and receives a notification for completion of data conversion from the data conversion part 140'. In addition, the controller 130 outputs a fax transmission number, which is fax destination information, to the data transmission part 150, reads out the transmission image data from the transmission data storage part 220, and forwards the read transmission image data to the data transmission part 150.

The data conversion part 140 includes a division processing part 141 and a resolution adjustment part 142. The data conversion part 140' obtains from the controller 130 the scan document assignment information, the fax transmission resolution information, and a data conversion start instruction that includes the scan resolution. In addition, the data conversion part 140' reads out the image data from the scan data storage part 210 and passes the image data to the division processing part 141. Then, the data conversion part 140' stores in the transmission data storage part 220 the image data after the conversion processing by the division processing part 141 as the transmission image data and notifies the controller 130 of the storage.

The division processing part 141 divides the image data received from the data conversion part 140' based on the obtained scan document assignment information and generates pre-adjustment transmission image data.

The resolution adjustment part 142 compares the resolution of the pre-adjustment transmission image data that the division processing part 141 generated and the fax transmission resolution designated by the user. When the fax transmission resolution is smaller, the resolution adjustment part 142 adjusts the pre-adjustment transmission image data. In other words, the resolution adjustment part 142 adjusts the resolution of the pre-adjustment transmission image data that the division processing part 141 generated so as to become the same as the fax transmission resolution and passes post-adjustment transmission image data to the data conversion part 140'. Then, the data conversion part 140' adds the obtained transmission resolution information to the image data after the conversion processing by the division processing part 141 and the resolution adjustment part 142, stores in the transmission data storage part 220 the image data as the transmission image data, and notifies the controller 130 of the storage. Here, the resolution adjustment part 142 performs thinning processing on the pre-adjustment transmission image data to adjust the resolution of the pre-adjustment transmission image data so as to become the same as the fax transmission resolution. A known method, such as a down sampling or the like, may be used for the thinning processing.

Figure 15:
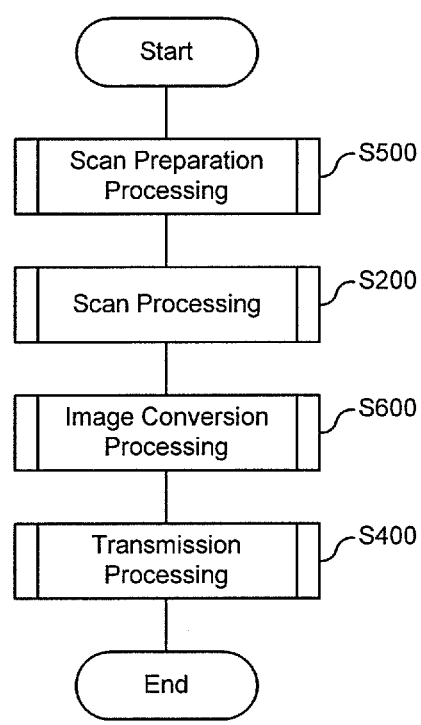
FIG. 15 is a flow diagram explaining a main flow of processing according to the second embodiment.

Next, the flow of processing by the MFP 600' with the above-described configuration is explained by using FIG. 15. The operation shown in FIG. 15 is a main flow of the processing according to the present embodiment. The main flow is first explained, and then differences from the first embodiment in each step shown in FIG. 15 are explained in detail.

First, at S500, the controller 130 executes a scan preparation processing and obtains a function intended by the user that is inputted via the operation panel 120. In the present embodiment, the scan-to-fax is explained as an example of a function inputted by the user. At this time, the user sets the fax transmission resolution information, the scan document assignment information and the fax destination information.

Next, the controller 130 controls the image scanning part 110 to execute the scanning of the document image on the scan document (S200).

When the image scanning part 110 generates image data, the data conversion part 140' executes the image conversion processing (S600). Here, the data conversion part 140' divides the obtained image data based on the scan document assignment information and adjusts the resolution of the obtained image data to the fax transmission resolution designated by the user.

Finally, the data transmission part 150 transmits the transmission image data to the fax destination (S400) and ends the series of the processing.

Figure 16:
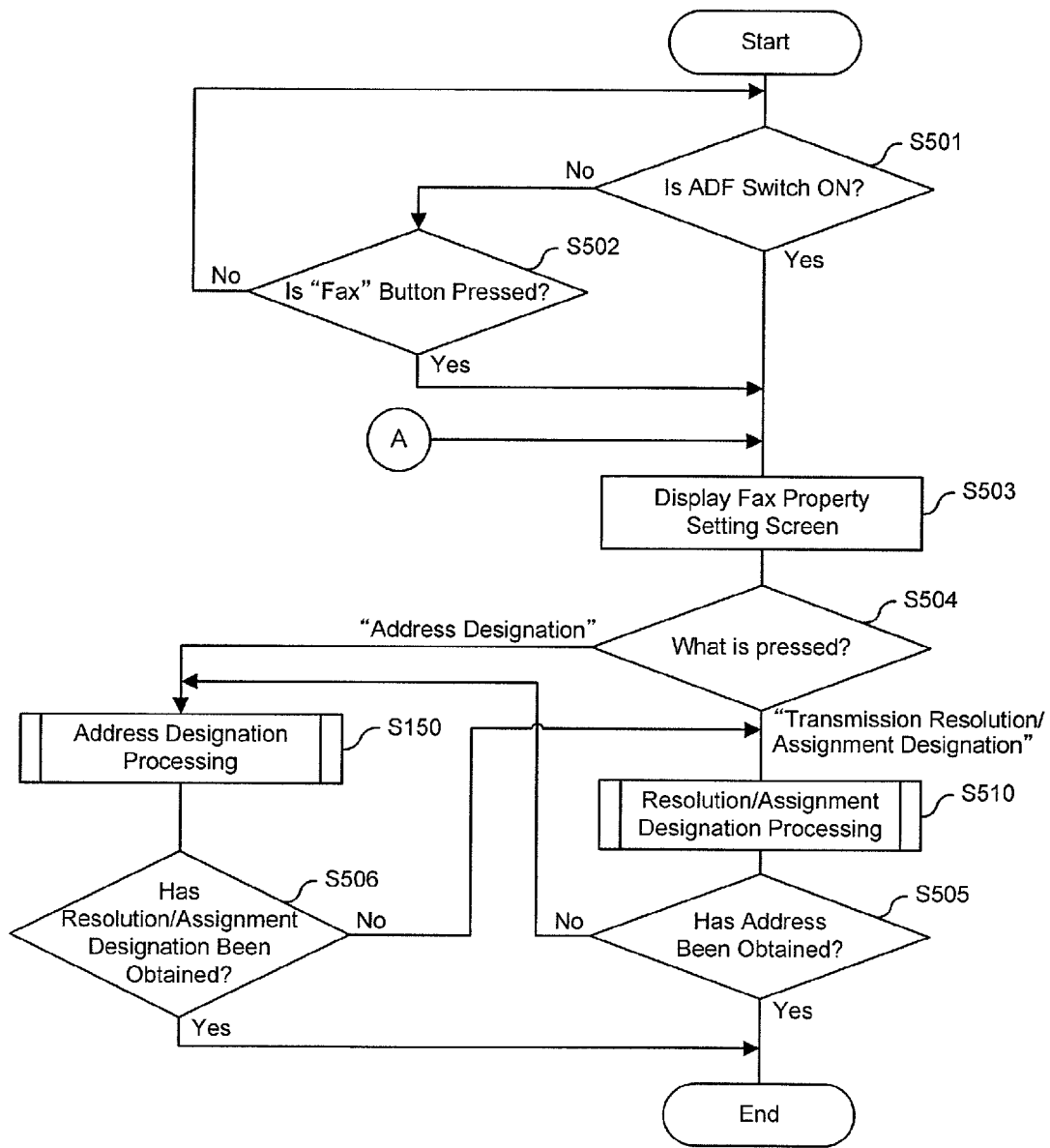
FIG. 16 is a flow diagram explaining scan preparation processing at S500 in FIG. 15.

Next, each step in the main flow in FIG. 15 is explained. FIG. 16 is a flow diagram explaining a scan preparation processing at S500 in FIG. 15. The scan preparation processing is executed by the controller 130 via the operation panel 120.

First, when the image scanning part 110 notifies of an ON signal from the ADF switch 115 is (Yes, S501) or when a depression signal that indicates that a "FAX" button has been pressed is inputted via the operation panel 120, that is, when the "FAX" button is pressed (Yes, S502), the controller 130 outputs an instruction to the operation panel 120 to display a fax property setting screen 700 shown in FIG. 4.

When the operation panel 120 displays the fax property setting screen 700 (S503) and when a "Transmission Resolution/Assignment Designation" button B11 is pressed by the user ("Transmission Resolution/Assignment Designation", S504), the controller 130 executes the resolution/assignment designation processing (S510).

After the completion of the resolution/assignment designation processing at S510, the controller 130 checks the temporary memory 131. When a fax destination has not been designated, that is, when an address has not been obtained (No, S505), the controller 130 executes address designation processing (S150). After the address designation processing at S150, the controller 130 checks the temporary memory 131 again. When the designation of the transmission resolution/assignment information has not been properly obtained, that is, when the resolution/assignment designation has not been obtained (No, S506), the controller 130 reexecutes the resolution/assignment designation processing at S510.

On the other hand, when the "Address Designation" button B12 is pressed by the user ("Address Designation," S504), the controller 130 executes the address designation processing (S150).

After the completion of the address designation processing at S150, the controller 130 checks the temporary memory 131. When the fax transmission resolution/assignment designation processing has not been executed, that is, when the resolution/assignment designation has not been obtained (No, S506), the controller 130 executes the resolution/assignment designation processing (S510). After the completion of the resolution/assignment designation processing at S510, the controller 130 checks the temporary memory 131 again. When a fax destination has not been properly obtained, that is, when an address has not been obtained (No, S505), the controller 130 reexecutes the address designation processing at S150.

Figure 17:
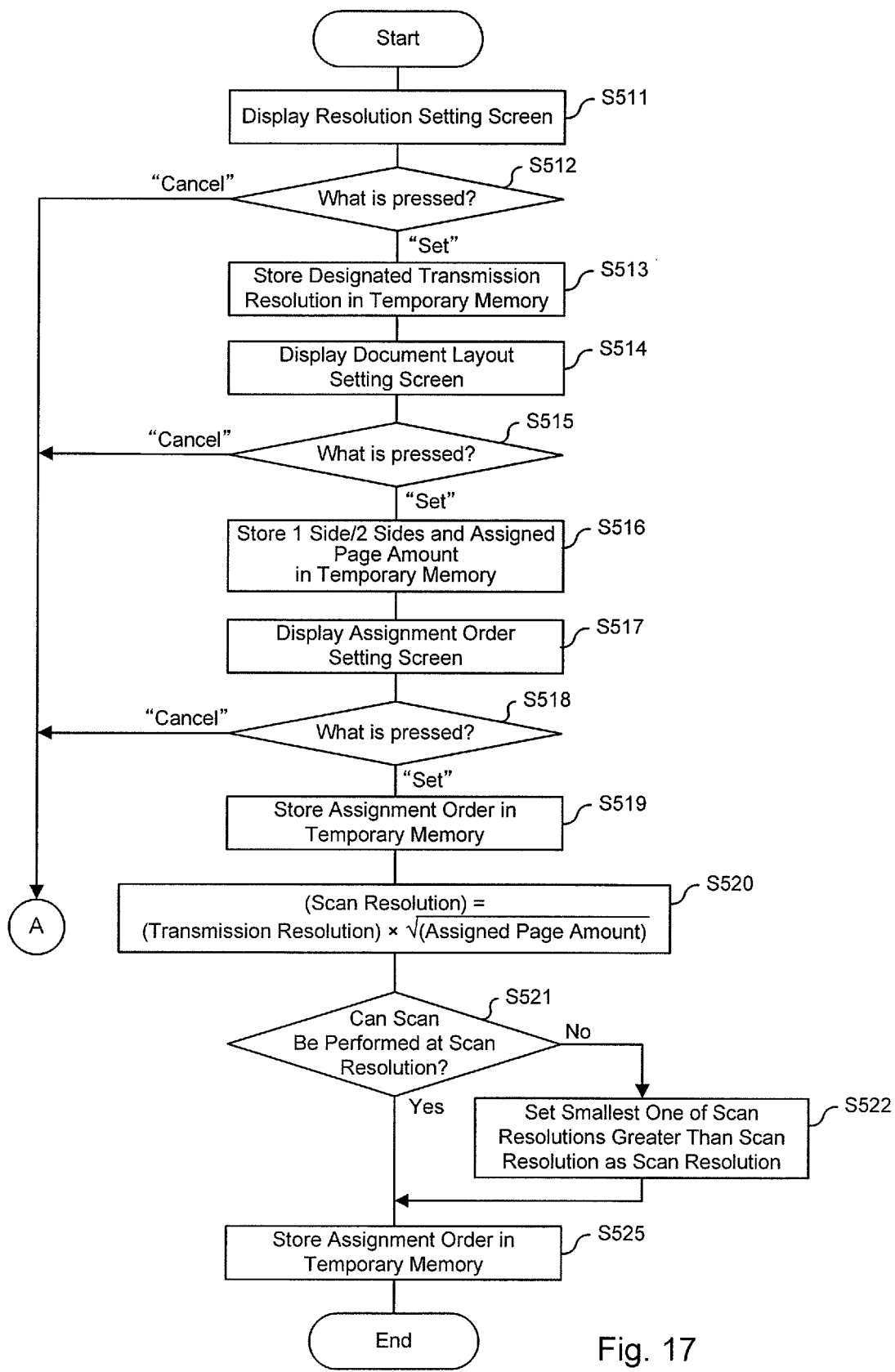
FIG. 17 is a flow diagram explaining resolution/assignment designation processing at S510 in FIG. 16.

FIG. 17 is a flow diagram explaining a resolution/assignment designation processing at S510 in FIG. 16. The resolution/assignment designation processing is executed by the controller 130 via the operation panel 120.

When the resolution/assignment designation processing is selected by the user, that is, when the "Transmission Resolution/Assignment Designation" button is pressed at S504 in FIG. 16 ("Transmission Resolution/Assignment Designation", S504), the controller 130 outputs an instruction to the operation panel 120 to display a resolution setting screen 710 shown in FIG. 6.

After receiving the display instruction from the controller 130, the operation panel 120 displays the resolution setting screen 710 (S511).

In the resolution setting screen 710 displayed on the operation panel 120, when a depression signal of the "Set" button B9 is inputted, that is, when the "Set" button is pressed ("Set", S512), the controller 130 stores in the temporary memory 131 the transmission resolution of 72 dpi, 150 dpi, 300 dpi or 600 dpi as designated by the user S513). Then, the controller 130 provides an instruction to display a document layout setting screen 720 shown in FIG. 7.

When a display instruction is received from the controller 130, the operation panel 120 displays the document layout setting screen 720 (S514).

In the document layout setting screen 720 displayed on the operation panel 120, when a depression signal for the "Set" button B9 is inputted, that is, when the "Set" button is pressed ("Set", S515), the controller 130 stores in the temporary memory 131 the designation of 1 side or 2 sides and the assigned page amount of the scan document (S516). Then, the controller 130 provides an instruction to display an assignment order setting screen 730 shown in FIG. 8.

When a display instruction is received from the controller 130, the operation panel 120 displays the assignment order setting screen 730 (S517).

In the assignment order setting screen 730 displayed on the operation panel 120, when the depression signal for the "Set" button B9 is inputted, that is, when the "Set" button is pressed ("Set", S518), the controller 130 stores in the temporary memory 131 the assignment order for the scan document (S519).

At S520, the controller 130 calculates a scan resolution by the image scanning part 110. More specifically, the controller 130 calculates the scan resolution by using the following equation:

(Scan Resolution)=(Transmission Resolution)× $\sqrt{\text{AssignedPageAmount}}$

For example, when a 2 UP document is sent by fax at 300 dpi, the controller 130 calculates the scan resolution as follows:

(Scan Resolution)=300 (dpi)×$\sqrt{2}$=424 dpi

Next, the controller 130 determines whether or not the MFP 600' can scan the document at the above-described calculated scan resolution.

In the example shown in FIG. 6 described above, the scan resolutions at which a scan process is executable by the MFP 600' (hereinafter, referred to as scan executable resolution) are 72 dpi, 150 dpi, 300 dpi and 600 dpi. Therefore, the scanning cannot be performed by the MFP 600' at the resolution of 424 dpi (No, S521). In this case, the controller 130 sets, as the scan resolution, the smallest one among the scan executable resolutions that are larger than the above-described calculated scan resolution (S522). In the present embodiment, the controller 130 sets 600 dpi as the scan resolution.

The set scan resolution is stored in the temporary memory 131 by the controller 130 (S525).

At S512, S515 and S518, when a "Cancel" button B10 is pressed by the user, the processing by the controller 130 returns to S503 in FIG. 16. Then, the controller 130 outputs an instruction to the operation panel 120 to display the fax property setting screen 700. The operation panel 120 that has received the display instruction from the controller 130 displays the fax property setting screen 700.

The scan processing by the image scanning part 110 at S200 in FIG. 15 is the same processing as in the first embodiment. Therefore, the explanation is omitted.

Figure 18:
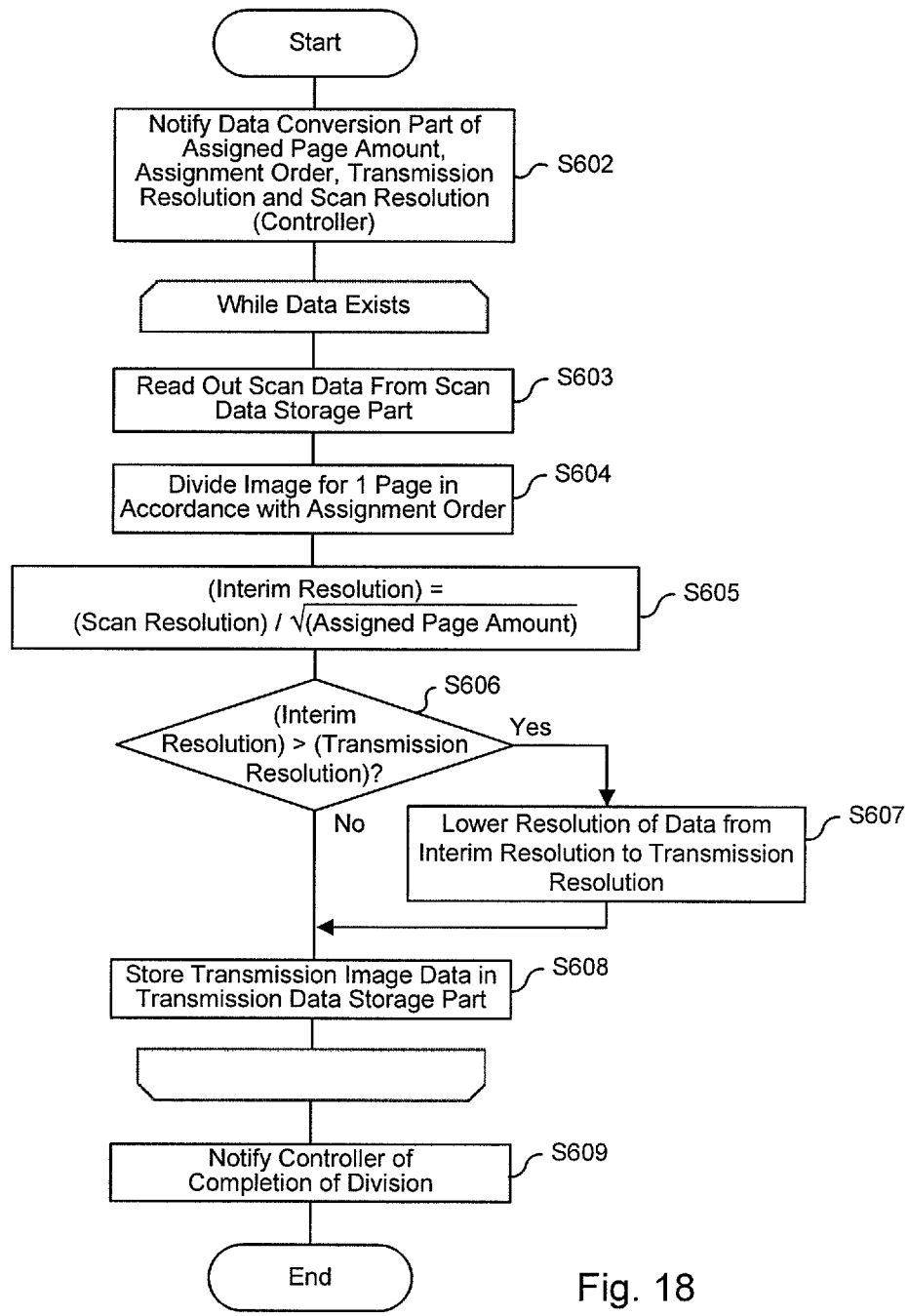
FIG. 18 is a flow diagram explaining image conversion processing by a data conversion part 140' at S600 in FIG. 15.

Next, the image conversion processing by the data conversion part 140' at S600 in FIG. 15 is explained by using the flow diagram in FIG. 18. The image conversion processing is executed by the controller 130 by controlling the data conversion part 140'.

The data conversion part 140' executes the image conversion processing when the assigned page amount stored at S516 in FIG. 17, the assignment order stored at S519 in FIG. 17 and a notification of the scan resolution stored at S525 in FIG. 17 are received from the controller 130 (S602).

The data conversion part 140' reads out the image data for one page of the scan document and passes the image data to the division processing part 141 (S603) while the image data exists in the scan data storage part 210.

The division processing part 141 divides the image data in accordance of the assignment order notified from the controller 130 (S604).

Here, the data conversion part 140' calculates the resolution of the image data after the division, that is, the pre-adjustment transmission image data (S605). An interim resolution is calculated from the following equation:

$$(\text{Interim Resolution}) = \frac{(\text{Scan Resolution})}{\sqrt{\text{Assigned Page Amount}}}$$

where the interim resolution is a resolution of the pre-adjustment transmission image data in which a document image scanned at a scan resolution is divided into N images.

For example, when an A4-size, 2 UP scan document scanned at the resolution of 600 dpi is divided into two to form an A5 size document in accordance with the layout, the data conversion part 140' calculates the interim resolution at this time as follows:

(Interim Resolution)=600 (dpi)/$\sqrt{2}$=424 dpi

Next, the data conversion part 140' compares the interim resolution calculated at S605 and the fax transmission resolution designated by the user. Here, when the interim resolution is larger than the transmission resolution (Yes, S606), the data conversion part 140' passes the pre-adjustment transmission image data to the resolution adjustment part 142. Then, the resolution adjustment part 142 executes processing to lower the resolution of the pre-adjustment transmission image data to the transmission resolution (S607).

For example, when the user designates the fax transmission resolution at 300 dpi, the resolution adjustment part 142 adjusts the pre-adjustment transmission image data at 424 dpi to the resolution at 300 dpi.

On the other hand, when the interim resolution calculated at S605 is the same as or smaller than the fax transmission resolution designated by the user (No, S606), or when the resolution adjustment processing at S607 has completed, the data conversion part 140' adds the transmission resolution information to the image data and sequentially stores as the transmission image data in the transmission data storage part 220 (S608).

When the entire image data stored in the scan data storage part 210 is read out and when the division processing is completed, the data conversion part 140' notifies the controller 130 of the completion of division (S609).

The transmission processing by the data transmission part 150 at S400 in FIG. 15 is the same processing as in the first embodiment. Therefore, the explanation is omitted.

As described above, according to the second embodiment, in addition to the advantages of the first embodiment, even when the transmission resolution designated by the user is not achieved from the scan resolution configurable at the MFP and the layout of the multi-page printing, the image data is transmitted at the transmission resolution designated by the user by adjusting the resolution of the image data created at higher resolution.

The embodiments in the present application are explained by using the MFP as an example of an image processing device. However, the present embodiments are not limited to the MFP but may be appropriately implemented in fax-only machines. Furthermore, the embodiments are explained by using fax transmission as an example of image data transmission. However, the embodiments may be appropriately implemented in other modes of image data transmission, such as scan-to-E-mail, scan-to-USB and scan-to-Network.

What is claimed is:

1. An image processing device, comprising:
   an image reading part that reads an image on a document and generates image data based on the image;
   an input part that accepts an input designation of a division number into which the image data of the document generated by the image reading part is divided, and an output resolution of output image data created based on the image data;
   a division processing part that creates divided image data by dividing the image data of the document by the division number accepted by the input part;
   a controller that sets a reading resolution based on the division number and the output resolution of the output image data; and
   a data output part that outputs the divided image data as the output image data, wherein
   the controller controls the image reading part to read the image on the document at the set reading resolution,
   the controller determines the reading resolution to read the image based on the division number and the output resolution, and sets the determined reading resolution as the set scan resolution,
   the controller calculates the reading resolution by multiplying the output resolution by a square root of the division number,
   the controller compares the calculated reading resolution and a plurality of preset read executable resolutions at which the image reading part is able to execute reading, and
   the controller sets, as the reading resolution, the smallest one among the read executable resolutions that are greater than the calculated reading resolution when the calculated reading resolution does not match the read executable resolution.

2. The image processing device according to claim 1, wherein
   the data output part transmits the divided image data as the output image data.

3. The image processing device according to claim 1, wherein
   the division processing part adds output resolution information to the divided image data, and
   the data output part outputs, as the output image data, the divided image data to which the output resolution information is added.

4. The image processing device according to claim 1, further comprising:
   a resolution adjustment part that calculates an interim resolution by dividing the reading resolution by a square root of the division number, that compares the interim resolution with the output resolution, and that creates adjusted image data by converting the reading resolution so as to match the interim resolution and the output resolution when the interim resolution is greater than the output resolution, wherein
   the data output part outputs the adjusted image data as the output image data.

5. The image processing device according to claim 1, wherein
   the input part that displays assignment regions of the document and accepts an input designation of an assignment order desired by the user by selecting assignment regions in an order, and
   the data output part outputs the image data based on the assignment order.

6. The image processing device according to claim 1, wherein
   the controller compares the calculated reading resolution and a preset read executable resolution at which the image reading part is able to execute scanning.

7. An image processing system, comprising:
   an image processing device; and
   an image forming device,
   wherein the image processing device comprises:
      an image reading part that reads an image on a document and generates image data based on the image;
      an input part that accepts an input designation of a division number into which the image data of the document generated by the image reading part is divided, and an output resolution of output image data created based on the image data;
      a division processing part that creates divided image data by dividing the image data of the document by the division number accepted via the input part;
      a controller that sets a reading resolution based on the division number and the output resolution of the output image data; and
      a data output part that outputs the divided image data and one of output resolution information and print output size information to the image forming device, wherein
   the controller controls the image reading part to read the image on the document at the set reading resolution, the controller determines the reading resolution to read the image based on the division number and the output resolution, and sets the determined reading resolution as the set reading resolution, the controller calculates the reading resolution by multiplying the output resolution by a square root of the division number, the controller compares the calculated reading resolution and a plurality of preset read executable resolutions at which the image reading part is able to execute reading, and the controller sets, as the reading resolution, the smallest one among the read executable resolutions that are greater than the calculated reading resolution when the calculated reading resolution does not match the read executable resolution, and wherein the image forming device comprises:
a data receiving part that receives the divided image data and one of the output resolution information and the print output size information from the image processing device; and an image forming part that determines a print output size of the divided image data received by the data receiving part, based on the one of the output resolution information and the print output size information received by the data receiving part, and prints the divided image data with the determined print output size.

8. An image processing method, comprising:
obtaining a division number, into which an image of a document is divided, and an image resolution;
setting a reading resolution based on the division number and the image resolution;
reading the image on the document at the set reading resolution to generate an image data;
creating divided image data by dividing the image data by the division number; and
outputting the divided image data as output image data, wherein the setting step includes a determining step that determines the reading resolution to read the image based on the division number and the output resolution, the setting step sets the determined reading resolution as the set reading resolution, the reading resolution is calculated by multiplying the output resolution by a square root of the division number, the calculated reading resolution and a plurality of preset read executable resolutions at which the image reading part is able to execute reading are compared, and the smallest one among the read executable resolutions that are greater than the calculated reading resolution is set as the reading resolution when the calculated reading resolution does not match the read executable resolution.

9. The image processing method in accordance with claim 8, wherein
the division number is an assigned page amount for the printed document using a multi-page printing function.

10. The image processing method in accordance with claim 8, wherein
the divided image data is generated by adding to information of the image resolution.

11. The image processing method in accordance with claim 8, wherein
the image resolution is a resolution for the divided image data that is output as the output image data.

12. The image processing method in accordance with claim 8, wherein
the image data is divided into the divided image data in accordance with an assignment order.

13. The image processing method in accordance with claim 8, further including:
adjusting the divided image data at the reading resolution to an adjustment image data at a substantially executable resolution.

* * * * *